2,797,454

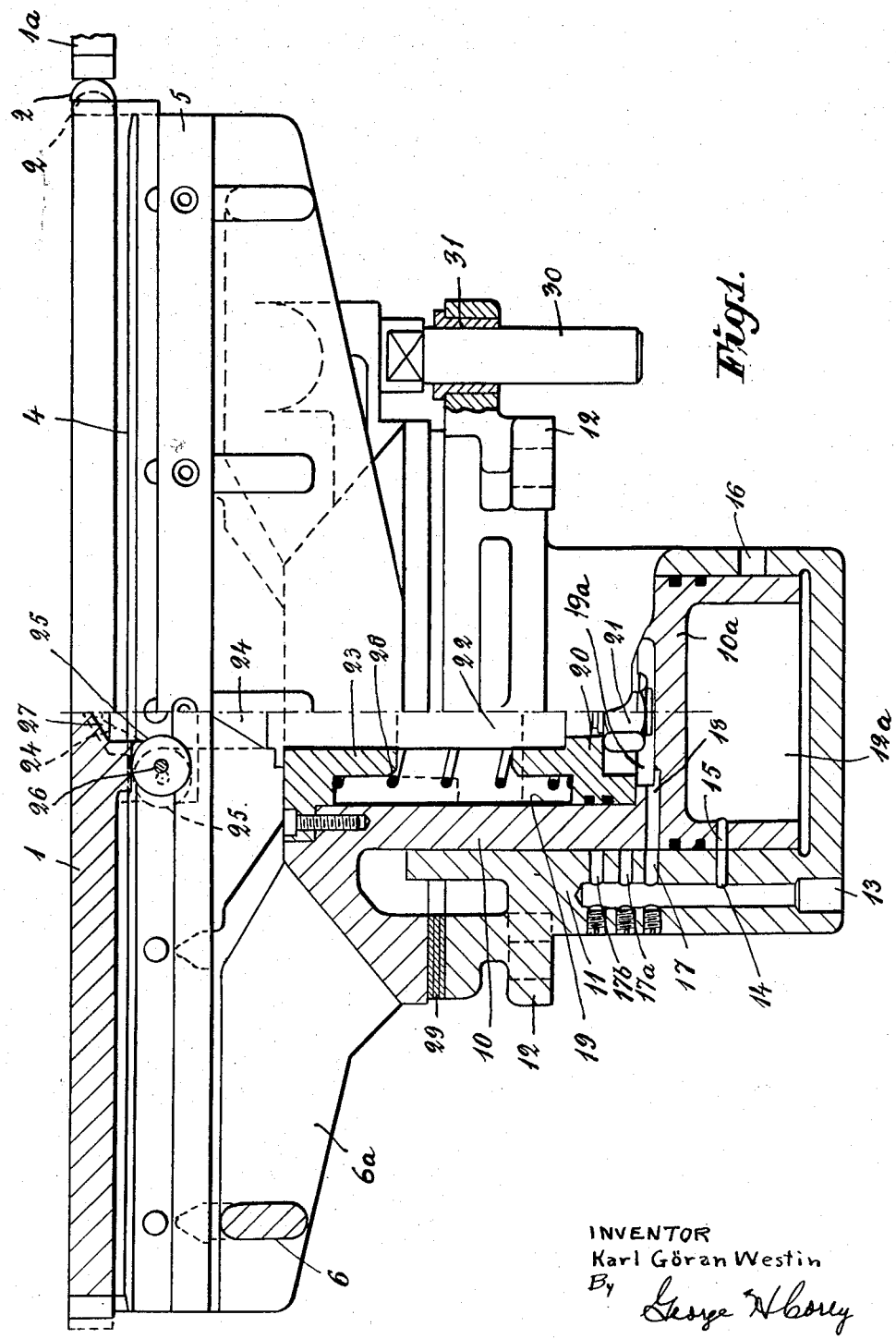

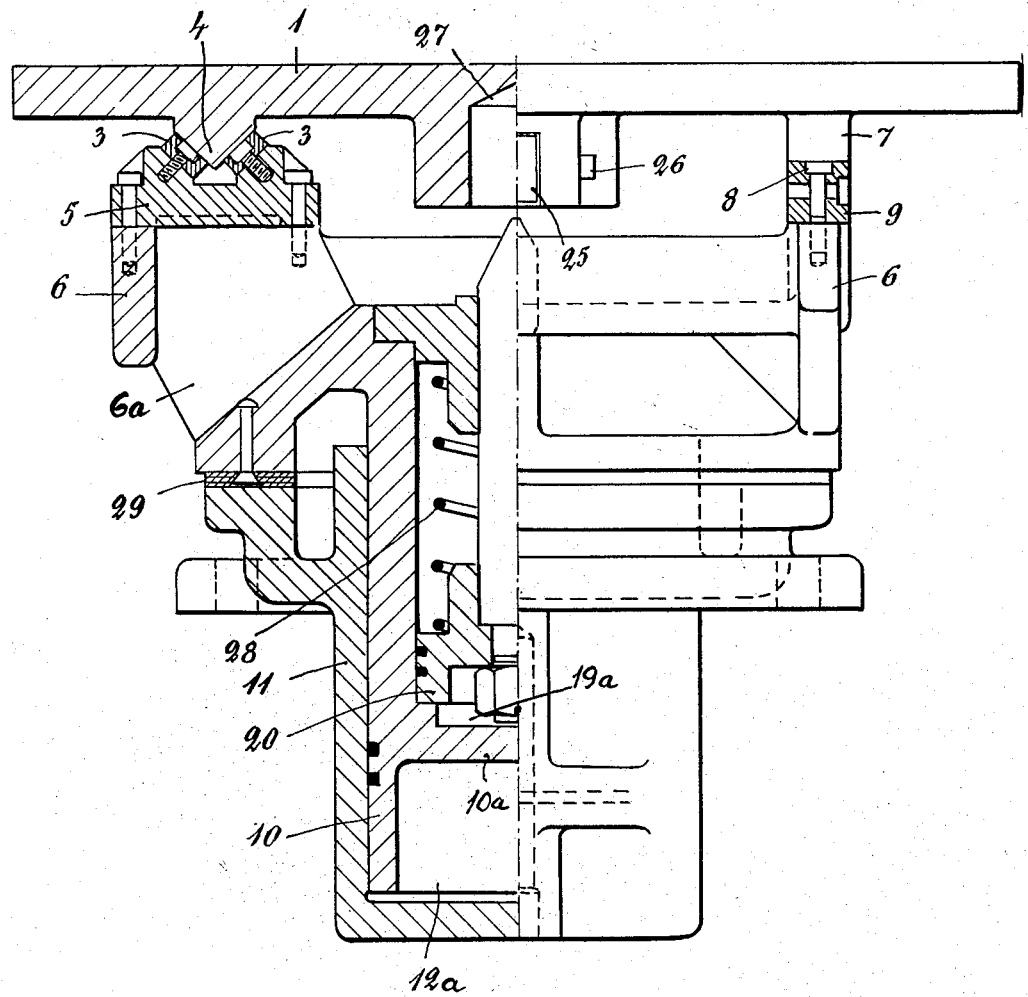

MOLDING MACHINE

Karl Göran Westin, Stockholm, Sweden, assignor to Aktiebolaget Westin & Backlund, Stockholm, Sweden Application November 30, 1954, Serial No. 472,181

Claims priority, application Sweden December 2, 1953

14 Claims. (Cl. 22—45)

The present invention relates to foundry machines, and more particularly the invention has for its object to provide certain new and useful improvements in molding machines of the kind in which a pattern plate, mold board or the like for supporting a flask is adapted to be pushed forward by engagement with the succeeding pattern plate, mold board, etc. in a series of such plates or boards so as to be conveyed from a jolting apparatus to the next operating station or stations of the machine, and during this conveying movement the adjacent pattern plates, etc. abut each other edgewise.

In operation of an automatic molding machine of this type it is of great importance that the vibrations produced in the jolting stage shall not be transmitted to the neighboring pattern plates or to other parts of the machine. However, since the successive pattern plates are in abutting interengagement at their edges it will be necessary in the jolting operation to separate these abutting pattern plates from each other.

The present invention has for its main object to provide means for effecting the separation of the abutting pattern plates during the jolting operation.

For the object stated, according to the present invention, a molding machine of the kind stated is mainly characterized by a movable dog or carrier operatively cooperating with said pattern plate, mold board or the like or with a part associated therewith, said dog or carrier being arranged, on one hand, during the treatment of the flask in said jolting apparatus to maintain said pattern plate or mold board in a position in which the same is spaced by a gap from the next succeeding pattern plate or mold board which already has been treated in said jolting apparatus and is being treated in the next treatment station, and, on the other hand, after completion of said jolting operation to release said pattern plate or mold board to enable it to be transferred to the next treatment station.

The invention will now be described more in detail, reference being had to the accompanying diagrammatical drawings illustrating by way of example one preferred embodiment thereof, and in which:

Fig. 1 is a vertical view, partly in section and partly in plan, of a molding machine constructed in accordance with this invention; and Fig. 2 is a vertical view, partly in section and partly in plan, taken at right angles to Fig. 1.

Referring now to the drawings more specifically, numeral 1 designates a detachable pattern plate on which the pattern is intended to be placed. This plate 1 is provided at each end with an abutment 2. The abutment disposed at the right of Fig. 1 is intended to cooperate with the adjacent pattern plate 1a in order, when displaced to the right, to push the plate 1a and the preceding plates in the machine in the same direction so as to move these plates by one step from one treatment station to the next station (not illustrated in the drawings) in the machine. The pattern plate 1 is, by means of a longitudinal V-shaped bar 4 disposed at its underside, supported on wear strips 3 secured to a guide member 5 and being set at an angle relative to each other which corresponds to that of the sliding surfaces of the V-bar 4. The guide member 5 is secured by screws on ribs or flanges 6 of an extension 6a of a jolting piston 10 operating in a cylinder 11. Further provided at the underside of the pattern plate 1 is a supporting bar 7 (Fig. 2) extending in spaced parallel relation to the sliding V-bar 4 and supported on a wear strip 9 which is secured by screws 8 to the ribs or flanges 6. The jolting cylinder 11 is provided with a bracket 12 for being clamped to any suitable stationary base or frame of the machine. A fiber packing 29 or other shim is inserted between the external portion of the jolting piston 10 and the jolting cylinder 11.

The jolting cylinder 11 has an inlet 13 for compressed air. Through a laterally extending passage 14 and a corresponding port 15 in the wall of the jolting piston 10, inlet 13 can be placed in communication with a downwardly open recess 12a in the lower portion of the jolting piston. At a level slightly below the inlet 14 the jolting cylinder 11 is provided with an outlet 16. Above the passage 14 the inlet passage 13 communicates with a plurality of cross-passages 17, 17a, 17b disposed at different levels. During the upward and downward strokes of the jolting piston 10 each one of these passages 17, 17a, 17b will in turn be placed in communication with an inlet passage 18 which opens into the lower portion 19a of a cylinder 19 formed as a chamber within the jolting piston and receiving a plunger 20. A partition wall 10a separates this cylinder 19, 19a from the chamber 12a.

Secured to the plunger 20 by means of a nut 21 is a centering pin 22. This centering pin extends upwardly through the cylinder 19 and passes through a bore in a guideway 23 which closes the upper end of the cylinder 19 and is secured to the piston 10. The centering pin is terminated at its upper end in a conical or chamfered end portion 24 which, when the plunger 20 and thus also the centering pin 22 is moved upwardly, will be caused to cooperate with a roller 25 which is rotatably mounted on an axle 26 secured to the pattern plate 1. As the centering pin 22 is displaced upwardly in this manner it will displace the roller 25, and thus also the pattern plate 1, to the left, as illustrated by the broken lines in Fig. 1, whereby a predetermined gap or space will be left between the right hand end abutment 2 of the pattern plate 1 and the left end of the adjacent pattern plate 1a. In this position the upper end of the centering pin 22 projects into a central recess 27 in the underside of the pattern plate. A restoring spring 28 tends to return the plunger 20 and the centering pin 22 in the downward direction. A guiding pin 30 displaceable in a guiding sleeve 31 rigidly connected to the jolting cylinder 11 is provided for centering the movement of the extension 6a.

In the inoperative position illustrated in full lines in the drawings, the extension 6a of the jolting piston 10 is supported on the jolting cylinder 11 through the fiber packing 29. After the sand has been filled into the flask supported on the pattern plate 1 and containing the pattern the pattern plate will have to be subjected to the jolting operation by admitting air under pressure into the chamber 12a below the jolting piston 10 through the passages 13, 14, 15, whereby this piston will be moved rapidly upwards until its lower edge uncovers the outlet port 16 relieving the pressure, after which the piston will return downwards owing to its own weight and the weight of its associated parts until the passages 14 and 15 will again be in registering position, whereupon the action is repeated. In this way the piston 10 and the pattern plate supported thereon will thus be subjected to a vibratory motion. In order that these vibrations shall not be transmitted to the adjacent pattern plates 1a or to other parts of the machine it is necessary for the pattern plate 1 during the jolting operation to be completely out of engagement with the adjacent pattern plate 1a, and this result is obtained in the manner described hereinbefore, in that the centering pin 22 will then be moved upwards by the plunger 20 under the action of the pressure built up within the chamber 19a, so that owing to the cooperation between the tapered head 24 of the centering pin 22 and the roller 25, said pin will move the pattern plate 1 a short distance to the left, to the position illustrated by the broken lines in Fig. 1. Both during the upward and downward strokes of the jolting piston 10 the necessary pressure within the chamber 19a is maintained since the passage 18 is then in communication with one of the passages 17, 17a, 17b whereby, during the whole jolting process, the centering pin 22 will remain in its uppermost position, and at the same time the pin preferably locates the pattern plate in its operating position due to its engagement into the recess 27 in the plate. Such location, however, could be provided for in any other suitable manner. The passages 17, 17a, 17b could also be replaced by a vertical slot in the wall of the cylinder 11.

The operative area of the jolting piston 10 which is subjected to the pressure within the chamber 19a is considerably less than the piston area facing the chamber 12a so that the pressure prevailing within the chamber 19a will not damp the vibrations produced. After completion of the jar-ramming operation, the supply of compressed air to the inlet 13 is cut off, and the plunger 20 together with the centering pin 22 will return to their bottom position in which the centering pin will not prevent the pattern plate 1 from being displaced to the right, so as to advance the pattern plate 1a and enable its replacement by a new pattern plate on the supporting guideways 5, 9.

Instead of moving the pattern plate 1 in common plane relative to the pattern plate 1a in the manner described, it would be possible also to attain an identical result by moving the pattern plate 1 to a level different from that of the pattern plate 1a. Furthermore, the centering pin 22 could be replaced by any suitable other movement transmitting device for displacing the pattern plate.

What I claim and desire to secure by Letters Patent is:

1. In a mold producing machine having a jolting station, at least one treatment station subsequent to said jolting station and mold supporting members movable in a horizontal path through said stations, said mold supporting members being in horizontal abutting relationship with each other in said path so that horizontal movement of one mold supporting member will advance the preceding mold supporting members, the combination of means for supporting and moving said mold supporting members along said path, means for jarring individual mold supporting members while in said jolting station and means for moving said individual mold supporting members while in said jolting station away from their abutting relation with the preceding mold supporting member prior to the jarring operation.

2. A mold producing machine comprising a series of succeeding treatment stations for molds in a path, mold supporting members, means for advancing said mold supporting members through said succeeding stations, said mold supporting members being in horizontal abutment in adjacent stations whereby advancing a first mold supporting member horizontally will advance a second mold supporting member in the preceding station; and a jolting apparatus at least in one of said stations, including first reciprocating means for periodically raising and lowering individual mold supporting members when positioned in said one station, and second reciprocating means for moving said individual mold supporting member in the direction opposed to said advancing movement prior to the jolting operation.

3. A mold producing machine as claimed in claim 2 additionally comprising means for slidably engaging and sustaining said mold supporting members along said path, and a piston mechanically connected to said sustaining means in said one station, and means for reciprocating said piston in a cylinder by the action of a pressure fluid.

4. A mold producing machine as claimed in claim 3 wherein said engaging and sustaining means comprises a cooperative tongue element and groove element for guiding said mold supporting member, one of said elements being provided on said mold supporting members.

5. A mold producing machine as claimed in claim 4, wherein said tongue element depends from said mold supporting members.

6. A mold producing machine as claimed in claim 2, wherein said first reciprocating means comprises a vertically movable piston within a cylinder, pressure fluid inlet means connecting the lower face of said piston to a source of pressure fluid so as to displace the piston upwardly from its resting position, and pressure fluid outlet means connecting said lower face to substantially atmospheric pressure when said piston has been raised a predetermined distance from said resting position whereby gravity returns said piston to said resting position.

7. A mold producing machine as claimed in claim 2, wherein said second reciprocating means comprises a piston vertically movable within a cylinder through the action of a pressure fluid, and a piston rod attached to said piston and provided with an inclined surface on the free end thereof cooperating when said piston rod moves upwardly with a complementary camming surface presented by said mold supporting members so as to move said individual mold supporting member along said path.

8. A mold producing machine as claimed in claim 2, wherein a camming roller is mounted on each of said mold supporting members, and said second reciprocating means comprises a piston vertically movable in a cylinder through the action of a pressure fluid, and a piston rod attached to said piston and provided with an inclined surface cooperating with said roller upon movement of said rod upward towards said individual mold supporting member so as to retract said individual mold supporting member from abutting position with the preceding mold supporting member located in the preceding station.

9. A mold producing machine as claimed in claim 2, wherein said mold supporting members are each provided with a recess in the underside and said second reciprocating means comprises a piston vertically movable in a cylinder through the action of a pressure fluid, and a piston rod attached to said piston and hvaing its free end portion provided with an inclined surface positioned to cooperate wtih said recess upon movement of said free end toward said individual mold supporting member so as to move said individual mold supporting member into a predetermined position.

10. A mold producing machine as claimed in claim 2, wherein said mold supporting members are each provided with a central recess in the underside, and said second reciprocating means comprises a piston vertically movable in a cylinder through the action of a pressure fluid, and a piston rod attached to said piston and having its free end portion provided with an inclined surface positioned to cooperate with a complementary camming surface of said central recess upon movement of said free end toward said individual mold supporting member so as to move said individual mold supporting member into a predetermined position relative to the jolting apparatus.

11. A mold producing machine as claimed in claim 2, wherein said first reciprocating means is mechanically connected to said second reciprocating means so as to cause a displacement of said second reciprocating means during reciprocation of said first reciprocating means.

12. A mold producing machine as claimed in claim 2, wherein said first reciprocating means comprises a first vertically movable piston in a first cylinder, and said second reciprocating means comprises a second cylindrical cavity within said first piston, and a second vertically movable piston within said second cylindrical cavity, said second piston having a piston rod attached thereto for moving said mold supporting member when in said jolting station in a direction opposite to said advancing movement, said first and second cylinders being connected to a common source of pressure fluid for moving said pistons.

13. A mold producing machine as claimed in claim 2, wherein said second reciprocating means comprises a piston vertically movable in a cylinder within the body of said first reciprocating means, said piston operating through the action of a pressure fluid, and an elastic member deformable upon the movement of said piston under pressure and acting as restoring means after release of pressure.

14. A mold producing machine as claimed in claim 2, wherein said second reciprocating means comprises a piston vertically movable in a cylinder through the action of a pressure fluid, said cylinder being displaceable upon the moving of said first reciprocating means, and inlet openings connecting said cylinder to a source of said pressure fluid during substantially its whole displacement caused by movement of said first reciprocating means.

References Cited in the file of this patent

UNITED STATES PATENTS 1,040,989    Atha et al. _____ Oct. 15, 1912

FOREIGN PATENTS 209,225    Great Britain _____ Jan. 10, 1924